(12) United States Patent
Carcouet et al.

(10) Patent No.: US 7,791,855 B2
(45) Date of Patent: Sep. 7, 2010

(54) VOLTAGE SURGE PROTECTION DEVICE AND ELECTRONIC CIRCUIT COMPRISING ONE SUCH A DEVICE

(75) Inventors: Sebastien Carcouet, Vif (FR); Philippe Baudesson, La Boissiere (FR); Didier Leonard, Seyssinet (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 317 days.

(21) Appl. No.: 11/921,137

(22) PCT Filed: May 30, 2006

(86) PCT No.: PCT/FR2006/001219

§ 371 (c)(1),
(2), (4) Date: Nov. 27, 2007

(87) PCT Pub. No.: WO2006/129005

PCT Pub. Date: Dec. 7, 2006

(65) Prior Publication Data

US 2009/0207542 A1    Aug. 20, 2009

(30) Foreign Application Priority Data

Jun. 3, 2005    (FR) .................................. 05 05616

(51) Int. Cl.
*H01C 7/21* (2006.01)

(52) U.S. Cl. ...................................... 361/117; 361/119

(58) Field of Classification Search ......... 361/117–120, 361/127
See application file for complete search history.

(56) References Cited

U.S. PATENT DOCUMENTS

| | | | | |
|---|---|---|---|---|
| 5,045,963 A | * | 9/1991 | Hansen et al. | 361/87 |
| 5,729,418 A | | 3/1998 | Lei | 361/58 |
| 6,714,393 B2 | * | 3/2004 | Nostrand | 361/58 |
| 2005/0243496 A1 | * | 11/2005 | Harris | 361/118 |

FOREIGN PATENT DOCUMENTS

| | | |
|---|---|---|
| DE | 197 22 838 | 12/1988 |
| EP | 0 497 478 | 8/1992 |
| FR | 2 795 567 | 12/2000 |

\* cited by examiner

*Primary Examiner*—Danny Nguyen
(74) *Attorney, Agent, or Firm*—Steptoe & Johnson LLP

(57) ABSTRACT

The voltage surge protection device comprises at least one input designed to be connected to an electric power supply system, at least one output designed to be connected to an electric circuit to be protected, and voltage surge limiting means connected between the inputs and outputs to protect said electric circuit against voltage surges able to be applied on the inputs. The voltage surge limiting means comprise bidirectional series electronic limiting means comprising at least two inputs/outputs connected in series with at least one of said inputs, and which are turned on when a low voltage drop occurs when a circulating current is lower than a current limiting value, and limiting said circulating current by increasing a voltage drop between said inputs/outputs.

14 Claims, 5 Drawing Sheets

VOLTAGE SURGE PROTECTION DEVICE AND ELECTRONIC CIRCUIT COMPRISING ONE SUCH A DEVICE

The present application is based on International Application PCT/FR2006/001219, filed May 30, 2006, which claims priority to French Patent Application No. 05 05616, filed Jun. 3, 2005, the entire contents of which are hereby incorporated by reference.

BACKGROUND OF THE INVENTION

The invention relates to a voltage surge protection device comprising at least one input designed to be connected to an electric power supply system, at least one output designed to be connected to an electric circuit to be protected, and voltage surge limiting means connected between the inputs and outputs to protect said electric circuit against voltage surges able to be applied on the inputs.

The invention also relates to an electronic circuit comprising one such protection device.

STATE OF THE ART

Known voltage surge protection devices generally comprise components parallel-connected on lines to be protected to limit voltage pulses by absorbing an interference current. For example, such components are varistors or gas-filled spark gaps able to absorb a very high quantity of electric energy.

The components also have to be current-limiting protected to be able to pass validation tests without being destroyed. Thus, in known manner, current-limiting resistors in varistors are series-connected on electronic circuit power supply lines.

The diagram of FIG. 1 shows an electronic circuit 1 comprising a state-of-the-art protection device described in Patent application FR2795567. In this diagram, a first protection device 10 has inputs 11 designed to be connected to an electric power distribution system and outputs 12 designed to be connected to down-line electronic circuits. In this case, the circuits are a rectifier 13, a voltage regulator 14 and a converter 15. In this particular diagram, a second protection device against voltage surges 17 is fitted down-line from the rectifier to improve voltage protection. In known manner, the devices 10 and 17 comprise series resistors series-connected on the lines and varistors parallel-connected down-line from the resistors 18. The resistors 18 protect the varistors by limiting the power absorbed.

State-of-the-art devices absorb the interference power in resistors and varistors to protect the electronic circuits. They are consequently bulky and very costly compared with the electric circuits they protect. In addition, series resistors have values that are able to be relatively high and impose a voltage drop in normal operation that can also be very high. Thus, in normal operation, the current flowing in the series resistors creates a power dissipation which heats the protective resistors. If the values of the resistances are reduced, protection of the varistors is no longer efficient.

SUMMARY OF THE INVENTION

The object of the invention is to provide a protection device that enables the drawbacks of state-of-the-art devices to be overcome, proposing efficient protection and reduced power dissipation, and also to provide an electronic circuit comprising one such protection device.

In a device according to the invention, the voltage surge limiting means comprise:
   bidirectional series electronic limiting means comprising at least two inputs/outputs series-connected with at least one of said inputs, and which are turned on when a low voltage drop occurs when a circulating current is lower than a current limiting value, and limiting said circulating current by increasing a voltage drop between said inputs/outputs, and
   parallel electronic limiting means connected down-line from said series electronic limiting means to limit at least one output in protection voltage enabling the flow of interference current limited by said series electronic limiting means, said parallel electronic limiting means protecting said electronic circuit by branching off an interference current.

Preferably, the series electronic limiting means comprise two series-connected field effect transistors having their reference electrodes connected to a central part, their output electrodes being connected between said inputs/outputs, and their control electrodes being connected to said central part, said current limiting value being defined by a limit value of the control voltage between the control electrodes and the respective reference electrodes and internal resistors of the transistors.

Advantageously, the series electronic limiting means comprise limiting adjustment resistors series-connected with said reference electrodes in their central part, said current limiting value also being defined with values of said adjustment resistors.

Advantageously, the series electronic limiting means comprise protective diodes protecting the junctions of said series-connected limiting field effect transistors parallel-connected to said limiting adjustment resistors.

Preferably, the series electronic limiting means have a series limiting voltage defined by an avalanche voltage or a breakdown voltage between the output electrodes and the respective reference electrodes of said series limiting transistors.

Advantageously, the series electronic limiting means comprise first avalanche diodes connected between the reference electrodes and the output electrodes of each transistor to enable direct flow of the circulating current in one direction and to limit a voltage on the transistors to an avalanche voltage in an opposite direction, said avalanche voltage of said first avalanche diodes being lower than a breakdown voltage of said transistors, said series limiting voltage being defined by avalanche voltages of said first avalanche diodes.

To increase the protection voltage, the voltage surge limiting means comprise at least two series-connected series electronic limiting means.

Preferably, the voltage surge limiting means comprise at least series electronic limiting means connected in series with each of the inputs.

Advantageously, the series electronic limiting means limit to a limiting voltage of more than 1000 volts.

Advantageously, the series electronic limiting means comprise transistors withstanding a voltage greater than or equal to a limiting voltage of more than 1000 volts.

Advantageously, the series electronic limiting means comprise field effect transistors having a series resistance in the on state of less than 10 ohms.

Advantageously, the series electronic limiting means comprise field effect transistors made from silicon carbide.

Advantageously, the parallel electronic limiting means comprise at least one avalanche effect diode connected on output of the series electronic limiting means.

An electronic circuit comprising connection inputs to an electric power distribution system, and an circuit electric to be protected according to the invention comprises at least one voltage surge protection device as defined above comprising voltage surge limiting means connected between said connection inputs to an electric power distribution system and said electric circuit to protect the latter against voltage surges able to be applied on the inputs.

In a preferred embodiment, the electric circuit to be protected is an electronic supply circuit comprising a rectifier, a filtering capacitor, and a converter connected down-line from the series electronic limiting means and in parallel with the parallel electronic limiting means of the protection device.

BRIEF DESCRIPTION OF THE DRAWINGS

Other advantages and features will become more clearly apparent from the following description of particular embodiments of the invention, given as non-restrictive examples only and represented in the accompanying drawings, in which.

DETAILED DESCRIPTION OF PREFERRED EMBODIMENTS

Figure 1:
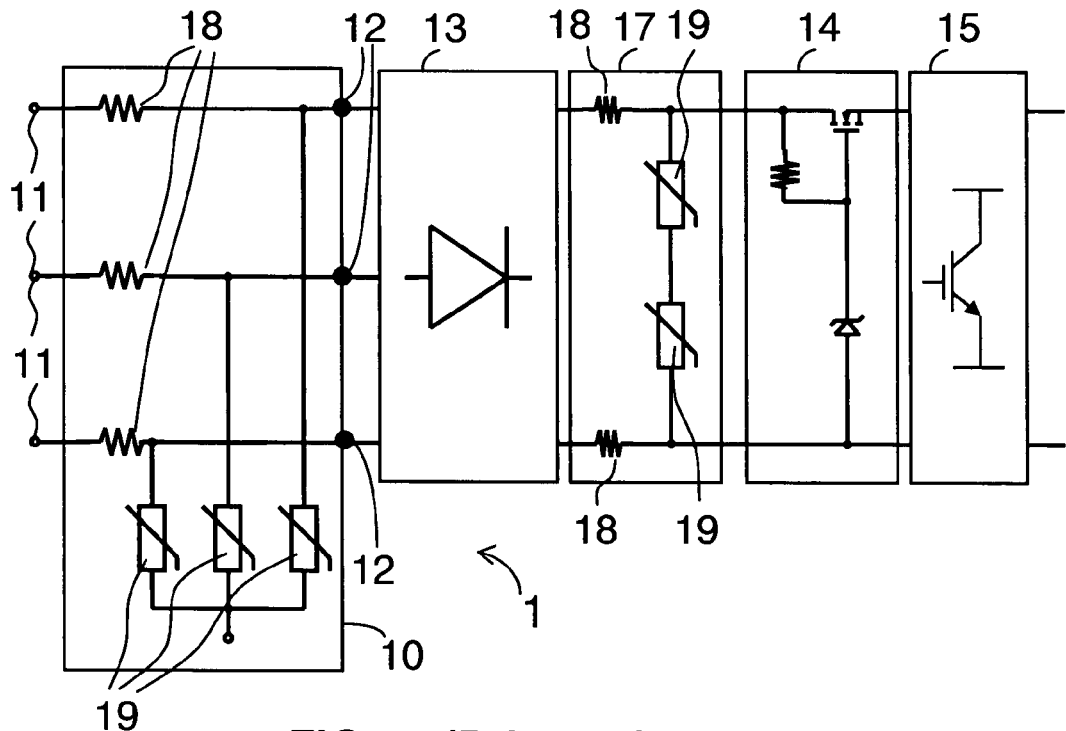
FIG. 1 represents a diagram of a state-of-the-art protection device in an electronic circuit.
Figure 2:
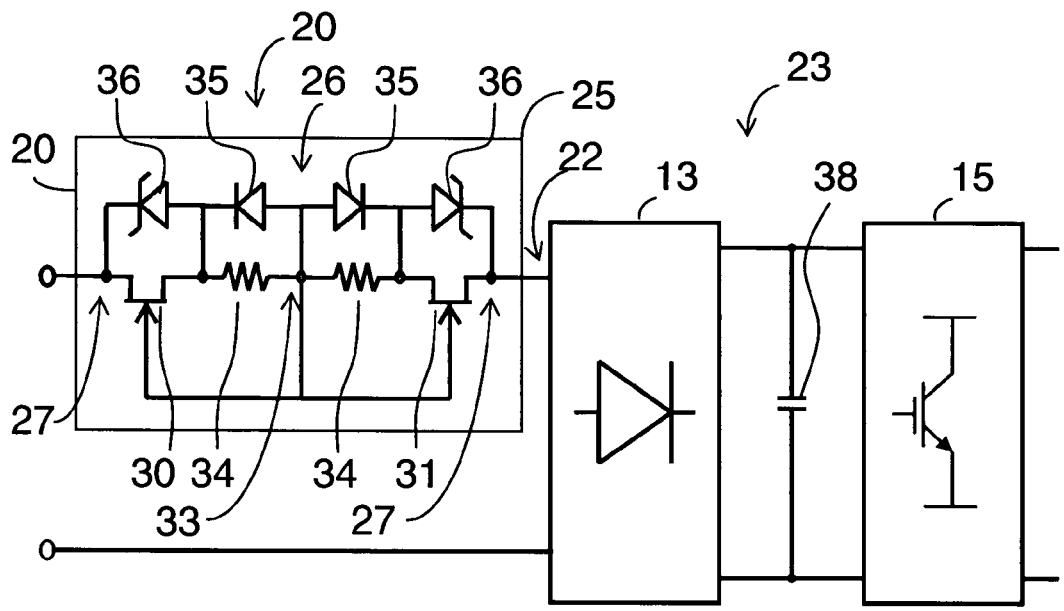
FIG. 2 represents a diagram of a protection device according to an embodiment of the invention protecting an electronic circuit.

The diagram of FIG. 2 shows a protection device 20 against voltage surges. It comprises an input 21 designed to be connected an electric power supply system, an output 22 designed to be connected to an electric circuit 23 to be protected, a current limiter withstanding a voltage surge 25 connected between the input 21 and output 22 to protect said electric circuit against voltage surges able to be applied on the input.

The current limiter 25 comprises a bidirectional series electronic current and voltage limiting circuit 26 comprising at least two inputs/outputs 27, connected in series with the input 21 and which are turned on when a low voltage drop occurs when a circulating current is lower than a current limiting value Ilim, and limiting said circulating current by increasing a voltage drop between said inputs/outputs.

In this embodiment, the bidirectional series electronic limiting circuit 26 comprises two series-connected field effect transistors 30 and 31 having their reference electrodes or sources connected to a central part 33, their output electrodes or drains connected between said inputs/outputs 27, and their control electrodes or gates connected to said central part, said current limiting value Ilim being defined by a limit value of the control voltage between the control electrodes and the respective reference electrodes and internal resistances of the transistors.

Advantageously, the electronic circuit 26 comprises limiting adjustment resistors 34 in the central part 33, which resistors are connected in series with said reference electrodes, said current limiting value Ilim also being defined with values of said adjustment resistors 34. Preferably protection diodes 35 protecting the junctions of said field effect series limiting transistors 30 and 31 are connected in parallel to said current limiting adjustment resistors 34. The resistance values are very low, about few ohms. The reference voltage of a transistor is about 0.5 volts corresponding to a junction DC voltage which is low compared with a power system voltage.

In the diagram of FIG. 2, the electronic circuit 26 comprises first avalanche diodes 36 in the central part 33, which diodes are connected between the reference electrodes and the output electrodes of each transistor 30 and 31 to enable direct flow of the circulating current in one direction and to limit a series limiting voltage Vlim on the transistor to an avalanche voltage in an opposite direction. Said avalanche voltage of said first avalanche diodes is preferably lower than a breakdown voltage of said transistors 30 and 31, and said series limiting voltage Vlim is defined by avalanche voltages of said first avalanche diodes.

In FIG. 2, the electronic circuit 23 comprises a rectifier, a filtering capacitor 38 connected down-line from the rectifier and a converter 15. Thus, such an electric circuit 23 to be protected can be an electronic supply circuit comprising a rectifier 13, a filtering capacitor 38, and a converter 15 connected down-line from the series electronic limiting means and in parallel with the parallel electronic limiting means of the protection device.

Figure 3:
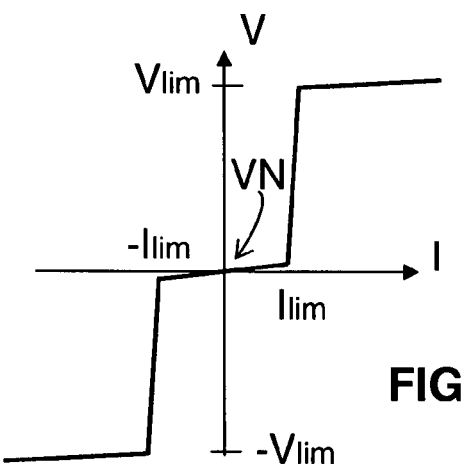
FIG. 3 represents an operating curve of a protection device according to a first embodiment of the invention.

FIG. 3 shows an operating curve of a bidirectional series electronic limiting circuit 26. The current limiting values Ilim are positive and negative, as are the voltage limiting values Vlim. A normal operating voltage VN is very low whereas the current is lower than a limiting value.

With a protection device according to an embodiment of the invention, the voltage drop VN in normal operation is very low. Operation of the electronic circuit is therefore not disturbed and the dissipated power is also very low. When a voltage surge interference is present, the circuit 26 quickly operates in current limiting mode and the voltage between the inputs/outputs of the circuit increases to oppose flow of the interference current. For example, the circuit 26 operates as a dynamic trap preventing the interference from passing through. It itself absorbs little electric interference energy. In addition, with a current limiting layout, the circuit 26 does not require a parallel resistor or other polarization component.

Figure 4:
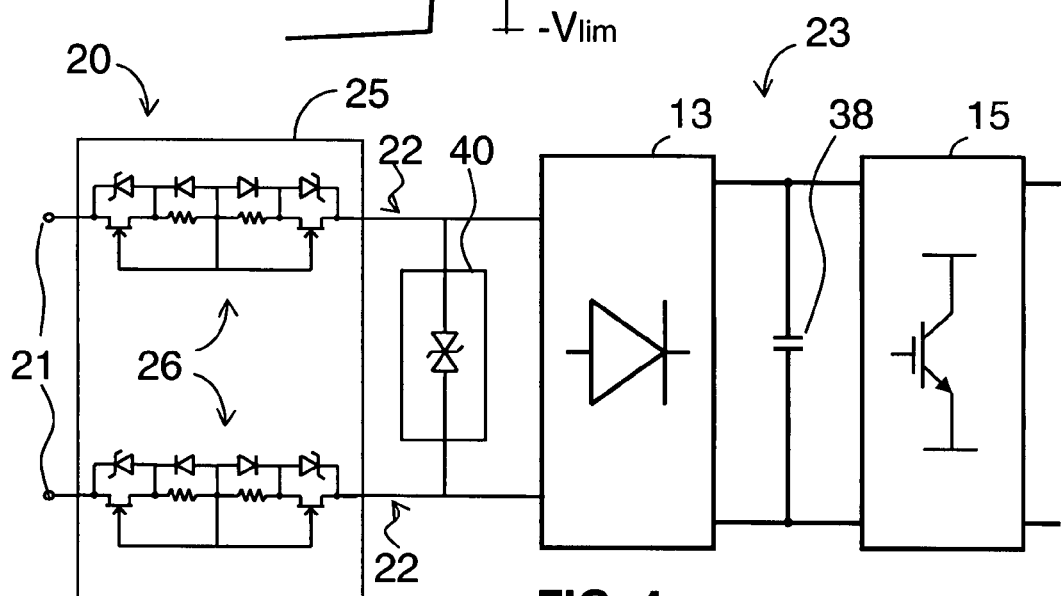
FIG. 4 represents an electronic circuit with a protection device according to a second embodiment of the invention.
Figure 5:
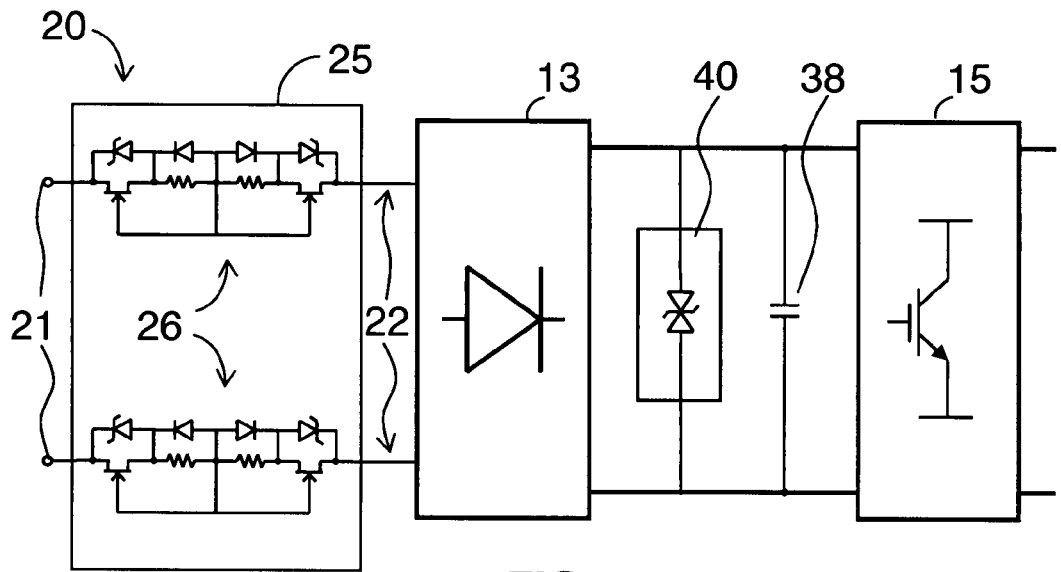
FIG. 5 represents an alternative embodiment of an electronic circuit according to an embodiment of FIG. 4.

FIG. 4 shows an electronic circuit with a protection device 20 with a limiter 25 comprising bidirectional series electronic limiting circuits 26 arranged in series on each power supply line. In this figure, the protection device also comprises a parallel electronic limiting circuit 40 connected down-line from the two bidirectional series electronic limiting circuits 26. The circuit 40 limits an output in protection voltage allowing flow of an interference circulating current limited by the series electronic limiting circuits. The circuit 40 thereby enables a current flow to be created even if the down-line electronic circuit consumes little or is absent. In FIG. 5, the circuit 40 is connected down-line from the rectifier 13. Said parallel electronic limiting means 40, 41 therefore protect said electronic circuit by directly branching off an excess interference current.

In FIGS. 4 and 5, a bidirectional series electronic limiting circuit 26 is arranged in series on the phase line and the neutral line of the power supply system. The circuits 26 are then two in number to withstand the line to neutral voltage surge of the supply voltage. Differences in the static characteristics of the transistors of the two bidirectional series electronic limiting circuits 26 mean that the current limit values Ilim for each circuit 26 can be different or not. Thus, depending on the static behavior of the limiters, in case of a voltage surge, the voltage increase of the line to neutral power system voltage can take place progressively on the whole assembly or in cascade on each limiter. This means that the current in the mesh which is subjected to the power system voltage surge is also always limited by one of the two circuits 26. Thus, when the first limiting circuit, which initially had to withstand the whole of the power system voltage surge, avalanches, the other limiting circuit takes over in turn withstanding the rest of the power system voltage surge under reduced current.

Figure 6:
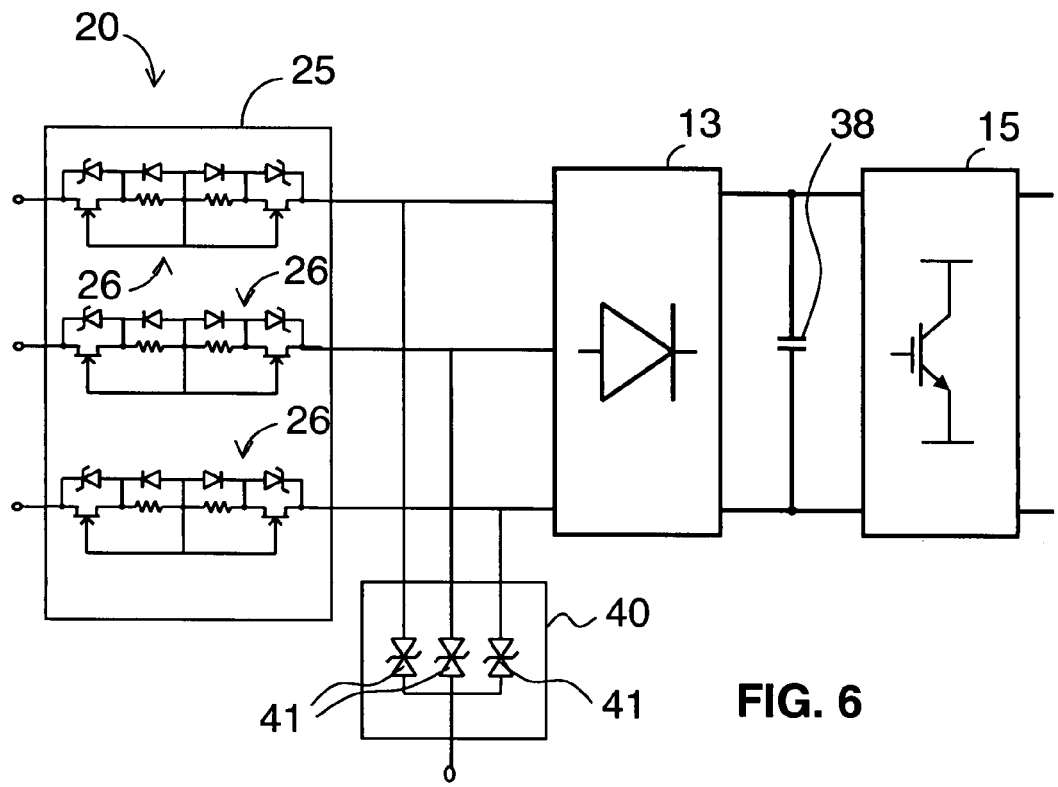
FIGS. 6 and 7 represent circuits with three-phase protection devices according to embodiments of the invention.
Figure 7:
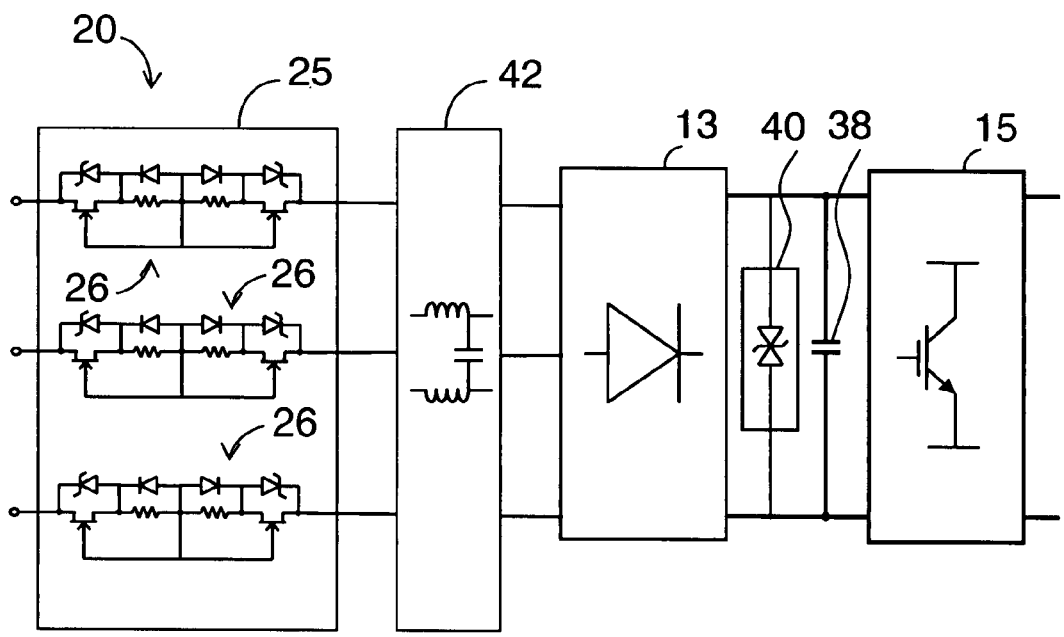

FIGS. 6 and 7 show circuits supplied in three-phase current. The limiter 25 thus comprises three series electronic limiting circuits 26. In FIG. 6, the parallel limiting circuit 40 is connected on output of the limiter 25 and comprises three second avalanche diodes 41 bidirectional in current and voltage. In FIG. 7, a filter 42 against high-frequency interferences in conducted mode is fitted down-line from the limiter 25 and before the bridge rectifier. In this arrangement, the limiter 25 performs voltage protection of the components of the filter, in particular of the capacitors connected in parallel on the lines.

In FIGS. 6 and 7, a bidirectional series electronic limiting circuit 26 is arranged in series on each supply line. The circuits 26 are then two in number to withstand the composed voltage surge of the three-phase supply lines. According to the static behavior of the limiters, in case of a voltage surge, the voltage increase of the composed power system voltage takes place progressively on the whole assembly or in cascade on each limiter. This means that the current in the mesh which is subjected to the power system voltage surge is also always limited by one of the two circuits 26.

FIGS. 8 to 12 show diagrams of different limiters 25 of devices according to embodiments of the invention. Advantageously, in FIG. 8, said current limiting value Ilim is defined by a limiting value of the control voltage between the control electrodes and the respective reference electrodes and internal resistances of the transistors, and a series limiting voltage Vlim is defined by an avalanche voltage between the output electrodes and the respective reference electrodes of said series limiting transistors.

Figure 8:
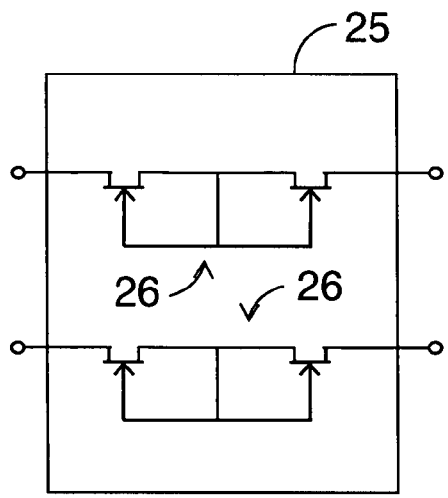
FIGS. 8, 9, 10, 11 and 12 represent alternative embodiments of devices according to embodiments of the invention.
Figure 9:
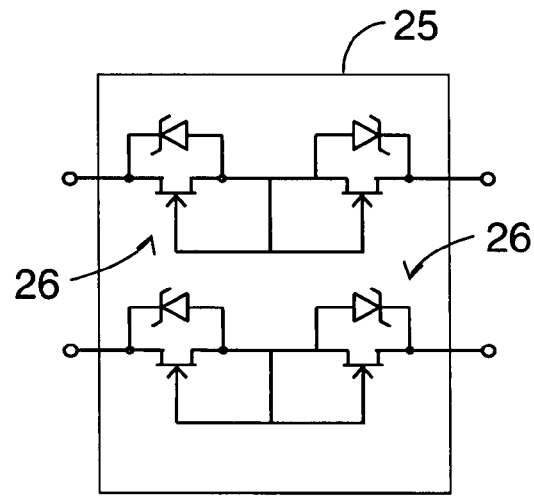

In FIG. 9, said current limiting value Ilim is defined as in FIG. 8, and a series limiting voltage Vlim is defined by avalanche voltages of first avalanche diodes 36. These diodes also protect the series limiting transistors from a voltage breakdown between their output electrodes and their reference electrodes.

Figure 10:
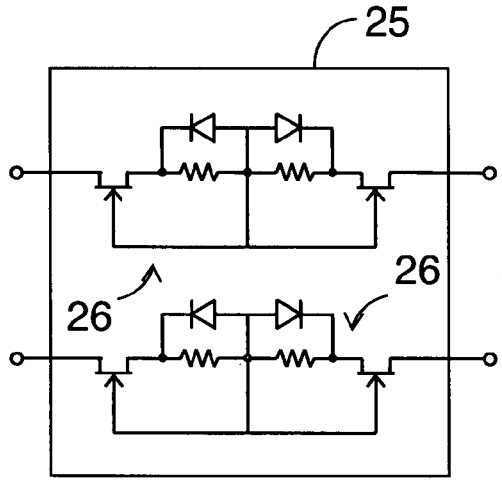

In FIG. 10, said current limiting value Ilim is defined by a limit value of the control voltage between the control electrodes and the respective reference electrodes, of the internal resistances of the transistors and of the limiting adjustment resistors 34 connected in series with said reference electrodes, and a series limiting voltage Vlim is defined as in the circuit of FIG. 8.

Figure 11:
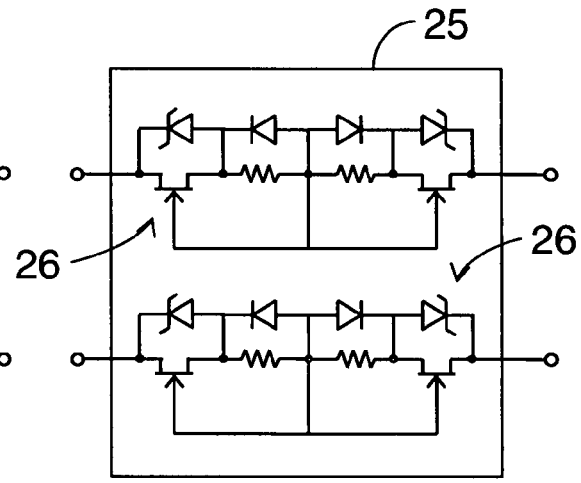

In FIG. 11, said current limiting value Ilim is defined by a limit value of the control voltage between the control electrodes and the respective reference electrodes, of the internal resistances of the transistors and of the limiting adjustment resistors 34 connected in series with said reference electrodes, and a series limiting voltage Vlim is defined by avalanche voltages of first avalanche diodes 36.

Figure 12:
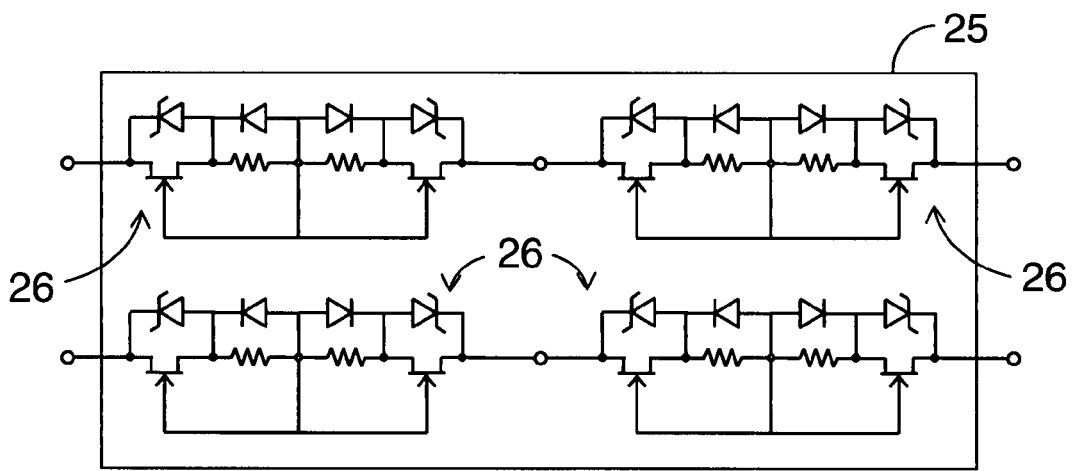

In FIG. 12, two bidirectional series electronic limiting circuits 26 are arranged in series on each power supply line. The circuits 26 are then four in number for the two power supply lines. If the current limit values Ilim for each circuit 26 are different, in case of a voltage surge, the voltage increase takes place progressively on the whole assembly or in cascade on each limiter according to the characteristics of the transistors.

Figure 13:
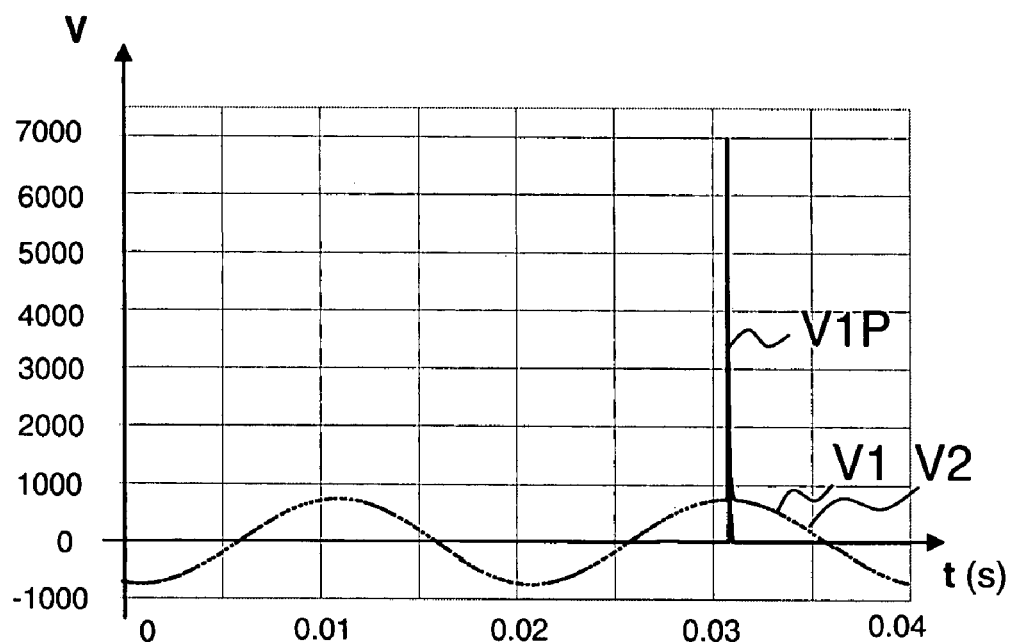
FIGS. 13 and 14 illustrate operating curves of devices according to embodiments of the invention.
Figure 14:
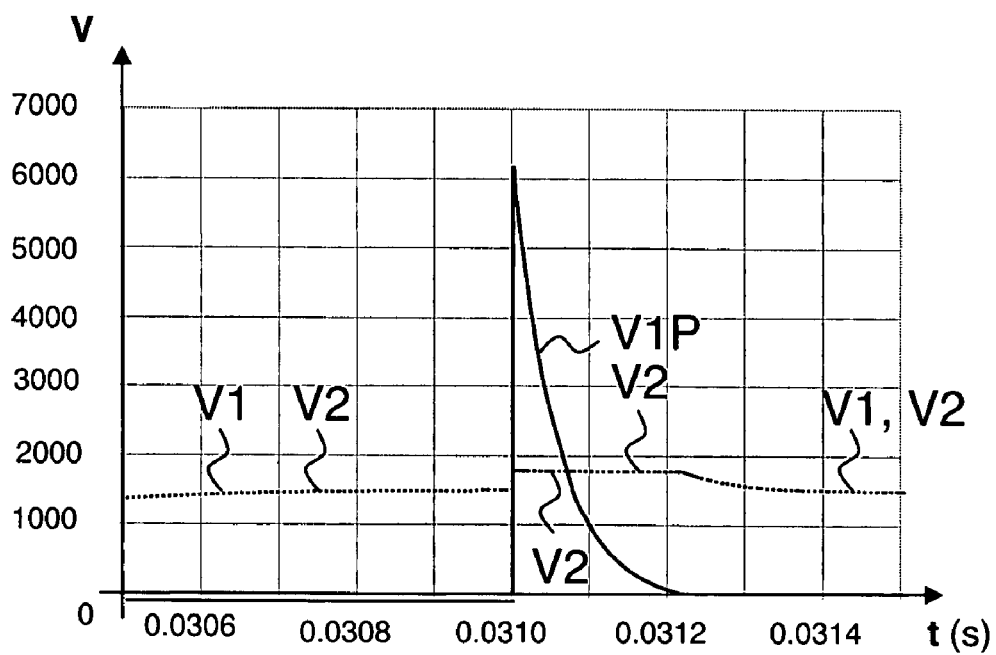

FIGS. 13 and 14 show voltage limiting performed by devices according to embodiments of the invention when an interference pulse is applied. A power system voltage V1 and a protected voltage V2 down-line from a limiter 25 are at about the same value as the voltage drop is very low. Then, when an interference voltage surge V1P is present, the output voltage V2 is limited and the voltage difference is limited and contained by the circuits 26 of a limiter 25.

Preferably, the bidirectional series electronic limiting circuits 26 limit to a limiting voltage greater than 1000 volts. Advantageously, this limiting voltage is greater than 2500 volts or preferably greater than 3300 volts. Series connection of the transistors of the circuits 26 enables the limiting voltage to be increased. Thus, the transistors used in the circuits 26 withstand voltages equal to or greater than the limiting voltages Vlim, respectively greater than 1000, 2500 or 3300 volts.

Advantageously, the series electronic limiting means 26 comprise field effect transistors having a series resistance in the on state of less than 10 ohms. Preferably these field effect transistors are of the silicon carbide type enabling reduced component sizes to be had for high operating voltages and low resistances in the on state.

Advantageously, the parallel electronic limiting means comprise at least one avalanche effect diode 41 connected on output of the series electronic limiting means. These avalanche diodes enable an interference current to be branched off directly up-line from the circuit to be protected.

The transistors 30 or 31 are preferably gate-junction field effect transistors enabling a negative control voltage on turn-on and a reverse on state. However other types of power transistors or semi-conductors can be used adapting the layouts to their functional characteristics.

The invention claimed is:

1. A voltage surge protection device comprising
at least one input for connection to an electric power supply system,
at least one output for connection to an electric circuit to be protected, and voltage surge limiting means connected between the inputs and outputs for protection said electric circuit against voltage surges to the inputs, wherein the voltage surge limiting means comprise:
bidirectional series electronic limiting means comprising at least two inputs/outputs series-connected with at least one of said inputs, and which are turned on when a low voltage drop occurs when a circulating current is lower than a current limiting value, and limiting said circulating current by increasing a voltage drop between said inputs/outputs, and bypass electronic limiting means connected down-line from said series electronic limiting means for limiting at least one output of protection voltage enabling the flow of interference current limited by said series electronic limiting means, said bypass electronic limiting means for protecting said electronic circuit by branching off an interference currently, wherein the series electronic limiting means comprise two series-connected field effect transistors having their reference electrodes connected to a central part, their output electrodes being connected between said inputs/outputs, and their control electrodes being connected to said central part, said current limiting value being defined by a limit value of the control voltage between the control electrodes and respective reference electrodes and internal resistances of the transistors.

2. The device according to claim 1 wherein the series electronic limiting means comprise limiting adjustment resistors series-connected with said reference electrodes in their central part, said current limiting value also being defined with values of said adjustment resistors.

3. The device according to claim 2 wherein the series electronic limiting means comprise protective diodes protecting the junctions of said series-connected limiting field effect transistors parallel-connected to said limiting adjustment resistors.

4. The device according to claim 1 wherein the series electronic limiting means have a series limiting voltage defined by an avalanche voltage or a breakdown voltage between the output electrodes and the respective reference electrodes of said series limiting transistors.

5. The device according to claim 1 wherein the series electronic limiting means comprise first avalanche diodes connected between the reference electrodes and the output electrodes of each transistor to enable direct flow of the circulating current in one direction and to limit a voltage on the transistors to an avalanche voltage in an opposite direction, said avalanche voltage of said first avalanche diodes being lower than a breakdown voltage of said transistors, said series limiting voltage being defined by avalanche voltages of said first avalanche diodes.

6. The device according to claim 1 wherein the voltage surge limiting means comprise at least two series-connected series electronic limiting means.

7. The device according to claim 1 wherein the voltage surge limiting means comprise at least series electronic limiting means connected in series with each of the inputs.

8. The device according to claim 1 wherein the series electronic limiting means limit to a limiting voltage of more than 1000 volts.

9. The device according to claim 1 wherein the series electronic limiting means comprise transistors withstanding a voltage greater than or equal to a limiting voltage of more than 1000 volts.

10. The device according to claim 1 wherein the series electronic limiting means comprise field effect transistors having a series resistance in the on state of less than 10 ohms.

11. The device according to claim 1 wherein the series electronic limiting means comprise field effect transistors made from silicon carbide.

12. The device according to claim 1 wherein the bypass electronic limiting means comprise at least one avalanche effect diode connected on output of the series electronic limiting means.

13. An electronic circuit comprising connection inputs to an electric power distribution system, and a circuit electric to be protected comprising at least one voltage surge protection device comprising voltage surge limiting means connected between said connection inputs to an electric power distribution system and said electric circuit to protect the latter against voltage surges able to be applied on the inputs, wherein the voltage surge protection device comprises:

at least one input for connection to an electric power supply system, at least one output for connection to an electric circuit to be protected, and voltage surge limiting means connected between the inputs and outputs for protection said electric circuit against voltage surges to the inputs, wherein the voltage surge limiting means comprise:

bidirectional series electronic limiting means comprising at least two inputs/outputs series-connected with at least one of said inputs, and which are turned on when a low voltage drop occurs when a circulating current is lower than a current limiting value, and limiting said circulating current by increasing a voltage drop between said inputs/outputs, and bypass electronic limiting means connected down-line from said series electronic limiting means for limiting at least one output of protection voltage enabling the flow of interference current limited by said series electronic limiting means, said bypass electronic limiting means for protecting said electronic circuit by branching off an interference currently, wherein the series electronic limiting means comprise two series-connected field effect transistors having their reference electrodes connected to a central part, their output electrodes being connected between said inputs/outputs, and their control electrodes being connected to said central part, said current limiting value being defined by a limit value of the control voltage between the control electrodes and respective reference electrodes and internal resistances of the transistors.

14. The electronic circuit according to claim 13 wherein the electric circuit to be protected is an electronic supply circuit comprising a rectifier, a filtering capacitor, and a converter connected down-line from the series electronic limiting means and in parallel with the bypass electronic limiting means of the protection device.

* * * * *